Patented June 24, 1941

2,247,147

UNITED STATES PATENT OFFICE 2,247,147

PROCESS OF PREPARING CYCLOPENTANE-HYDROPHENANTHRENE KETONES

Max Bockmühl, Gustav Ehrhart, and Heinrich Ruschig, Frankfort-on-the-Main-Hochst, Germany, assignors to Winthrop Chemical Company, Inc., New York, N. Y., a corporation of New York No Drawing. Application March 23, 1937, Serial No. 132,636. In Germany April 11, 1936

5 Claims. (Cl. 260—397.4)

The present invention relates to a process of preparing cyclopentane-hydrophenanthrene ketones.

We have found that these compounds may be prepared by transforming carboxylic acids of the general formula RCOOH wherein R stands for a cyclopentane-hydrophenanthrene residue, into the ketones of the general formula $R.CO.CH_3$ with the aid of organic metal compounds.

By starting for instance from the 3-hydroxy-cholenyl-carboxylic acid, the 3-acyl compound, for instance the 3-acetyl-hydroxycholenyl-carboxylic acid, may be transformed with the aid of magnesium-methyl-iodide by way of the chloride, amide and nitrile into the corresponding 3-acetoxy-pregnenolone.

The reaction proceeds for instance according to the following scheme:

From the acid (I) the corresponding nitrile (IV) is made by way of the chloride (II) and the amide (III). The nitrile may be purified by a distillation under a highly reduced pressure and a recrystallization from aqueous alcohol. By the action of a Grignard solution made from methyl iodide and magnesium the nitrile is transformed into the corresponding imino-compound (V) from which the corresponding ketone (VI) is formed by hydrolysis.

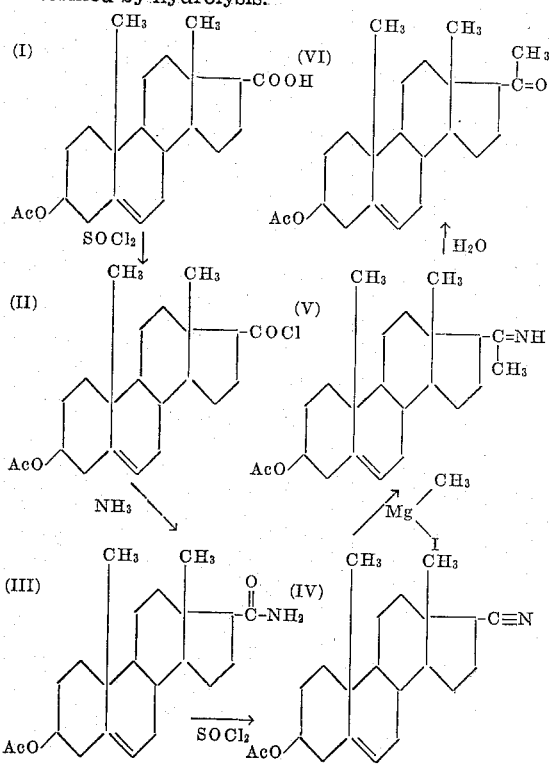

The reaction may likewise be performed with the corresponding saturated carboxylic acids. Instead of performing the reaction by way of the nitrile the Grignard solution may likewise be caused to act upon the corresponding carboxylic-acid-diethyl-amide and the ketone may thus be obtained directly.

By starting, however, for instance from the known aetiocholanic acid, this acid may be transformed by way of the chloride with the aid of zinc methyl into the corresponding 17-methyl-ketone.

The following examples serve to illustrate the invention, but they are not intended to limit it thereto:

(1) To a Grignard-solution made from 0.9 gram of magnesium and 5.4 grams of methyl iodide there is slowly added drop by drop 1 gram of the 3-acetoxy-aetiocholenyl-nitrile-(17) (IV) which has been obtained from the corresponding acid with the aid of a thionyl chloride by way of the amide. The mixture is heated for 3 hours on the hot water bath, the solvent is evaporated and the residue is heated for further 8 hours. The residue is then decomposed with ice-water and dilute sulfuric acid, the colloidal mixture is extracted with ether and the residue of the ethereal solution is distilled under a highly reduced pressure. The distillate is redissolved in methanol. The 3-acetoxy-pregnenolone-(20) obtained melts at 146° C. to 147° C. The yield amounts to 0.45 gram.

(2) To a Grignard solution made from 1.2 grams of magnesium and 7.1 grams of methyl iodide in 50 cc. of benzene there is added drop by drop a solution of 2.07 grams of 3-acetoxy-aetiocholenyl-carboxylic-acid-diethylamide which has been obtained by causing thionyl chloride to act upon the corresponding carboxylic acid and transforming the acid chloride thus obtained with the aid of di-ethyl amine. After the mixture has been heated for 3 hours on the water bath, the solvent is distilled under reduced pressure and the residue is heated for further 12 hours on the water bath. The residue is then decomposed with ice-water and dilute sulfuric acid, extracted with ether and the ethereal solution is washed with an acid and a solution of sodium carbonate. After the ether has been evaporated the organic residue is distilled under a highly reduced pressure; the temperature is raised to 200° C. at a pressure of 0.02 millimeter. After the distillate has been redissolved in aqueous alcohol there is obtained the acetoxy-pregnenolone which melts at 146° C. to 147° C. The yield amounts to 0.8 gram.

We claim:

1. Process which comprises converting a carboxylic acid of the general formula

RCOOH wherein R stands for a cyclopentane-hydrophenanthrene radical into a derivative selected from the group consisting of the amide and nitrile, treating said derivative with the compound of the formula

wherein Hlg stands for halogen, and subjecting the compound thus obtained to a hydrolyzing process.

2. The process which comprises causing thionyl chloride to act upon a compound of the following formula

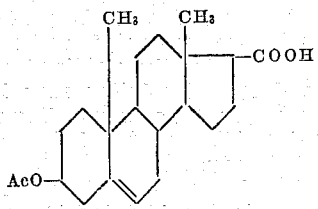

wherein Ac stands for an acyl radical, transforming the acid chloride thus produced into the corresponding amide by the action of ammonia and transforming the amide into the nitrile by the action of thionyl chloride, causing magnesium-methyl-iodide to act upon the nitrile and subjecting the imino-compound thus obtained to a hydrolysing process.

3. The process which comprises causing thionyl chloride to act upon the compound of the following formula

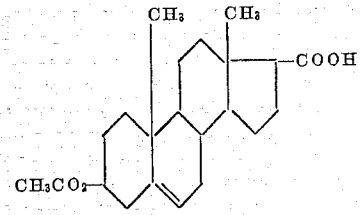

transforming the acid chloride thus produced into the corresponding amide by the action of ammonia and transforming the amide into the nitrile by the action of thionyl chloride, causing magnesium-methyl-iodide to act upon the nitrile and subjecting the imino-compound thus obtained to a hydrolysing process.

4. The process which comprises causing thionyl chloride to act upon a compound of the following formula

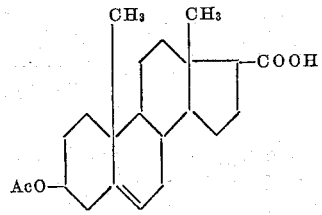

wherein Ac stands for an acyl radical, causing di-ethyl amine to act upon the acid chloride thus produced, causing the compound thus obtained to react with magnesium-methyl-iodide and subjecting the product of this addition to a hydrolysing process.

5. The process which comprises causing thionyl chloride to act upon the compound of the following formula

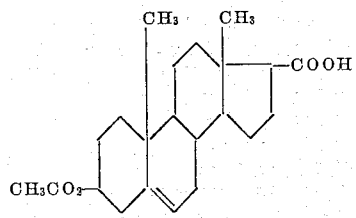

causing di-ethyl amine to act upon the acid chloride thus produced, causing the compound thus obtained to react with magnesium-methyl-iodide and subjecting the product of this addition to a hydrolysing process.

MAX BOCKMÜHL.
GUSTAV EHRHART.
HEINRICH RUSCHIG.